US010912254B2

(12) United States Patent
Andersen

(10) Patent No.: US 10,912,254 B2
(45) Date of Patent: Feb. 9, 2021

(54) INERTIA COMPENSATION FOR A RECIPROCATING MOWING SICKLE

(71) Applicant: AGCO International GmbH, Neuhausen (CH)

(72) Inventor: Jonas Toft Andersen, Randers (DK)

(73) Assignee: AGCO International GmbH, Neuhausen (CH)

(*) Notice: Subject to any disclaimer, the term of this patent is extended or adjusted under 35 U.S.C. 154(b) by 0 days.

(21) Appl. No.: 16/494,363

(22) PCT Filed: Feb. 28, 2018

(86) PCT No.: PCT/EP2018/054958
§ 371 (c)(1),
(2) Date: Sep. 16, 2019

(87) PCT Pub. No.: WO2018/166797
PCT Pub. Date: Sep. 20, 2018

(65) Prior Publication Data
US 2020/0375099 A1 Dec. 3, 2020

(30) Foreign Application Priority Data
Mar. 15, 2017 (GB) .................. 1704086.6

(51) Int. Cl.
A01D 34/14 (2006.01)
A01D 34/38 (2006.01)
(Continued)

(52) U.S. Cl.
CPC ............ *A01D 34/14* (2013.01); *A01D 34/04* (2013.01); *A01D 34/37* (2013.01); *A01D 34/38* (2013.01); *A01D 34/40* (2013.01); *A01D 41/141* (2013.01); *F16F 9/0218* (2013.01); *F16F 9/04* (2013.01); *F16F 9/096* (2013.01); *F16H 25/20* (2013.01); *F16F 2222/126* (2013.01); *F16F 2228/04* (2013.01); *F16H 2025/2037* (2013.01);
(Continued)

(58) Field of Classification Search
None
See application file for complete search history.

(56) References Cited

U.S. PATENT DOCUMENTS 280,901 A 6/1883 Edwin
992,134 A 5/1911 Kelly
(Continued)

FOREIGN PATENT DOCUMENTS

BE 553 117 A 12/1956
EP 2976936 A1 1/2016
GB 1383851 A 2/1975

OTHER PUBLICATIONS

European Patent Office, International Search Report for Related International Patent Application No. PCT/EP2018/054958, dated May 15, 2018.
(Continued)

*Primary Examiner* — Robert E Pezzuto
*Assistant Examiner* — Madeline Ivy Runco

(57) ABSTRACT

A mowing sickle drive system comprises a knife bar supported by a frame and drive apparatus operable to drive the knife bar in a reciprocating linear motion at a variable drive frequency. A spring is coupled to the knife bar for applying a restoring force to the knife bar toward a neutral position when in motion. The spring has a variable modulus of elasticity that is controlled dependent upon the drive frequency.

17 Claims, 5 Drawing Sheets

(51) Int. Cl.
*A01D 34/40* (2006.01)
*A01D 34/37* (2006.01)
*A01D 41/14* (2006.01)
*F16F 9/04* (2006.01)
*F16F 9/02* (2006.01)
*F16F 9/096* (2006.01)
*F16H 25/20* (2006.01)
*A01D 34/04* (2006.01)

(52) U.S. Cl.
CPC .............. *F16H 2025/2062* (2013.01); *F16H 2025/2068* (2013.01)

(56) References Cited

U.S. PATENT DOCUMENTS

| | | |
|---|---|---|
| 2,796,149 A | 6/1957 | Wallin |
| 3,112,652 A | 12/1963 | Freeborn |
| 5,787,786 A | 8/1998 | Zeuner |

OTHER PUBLICATIONS

UK Intellectual Property Office, Search Report for Priority Application No. GBI 704086.6, dated Sep. 6, 2017.

INERTIA COMPENSATION FOR A RECIPROCATING MOWING SICKLE

CROSS-REFERENCE TO RELATED APPLICATIONS

This application is a national phase entry under 35 U.S.C. § 371 of International Patent Application PCT/EP2018/054958, filed Feb. 28, 2018, designating the United States of America and published in English as International Patent Publication WO 2018/166797 A1 on Sep. 20, 2018, which claimed the benefit of the filing date of G.B. Patent Application 1704086.6, filed Mar. 15, 2017, for "Inertia Compensation for a Reciprocating Mowing Sickle," the disclosure of each of which is hereby incorporated herein in its entirety by this reference.

FIELD

The disclosure relates to mowing sickles as used in cutterbars of agricultural harvesting implements such as combine harvesters headers and mowers, wherein the mowing sickle is driven in a reciprocating linear motion.

BACKGROUND

Mowing sickles have been used for many years in agricultural applications, especially in cutterbars used to cut standing crop material. A cutterbar typically includes a knife bar supported by a frame in a manner which permits reciprocating linear motion in a direction that is perpendicular to the forward direction of travel. The knife bar typically includes a set of substantially triangular serrated knives arranged in a side-by-side relationship and secured to a bar which is driven in the reciprocating motion. The cutterbar may also include a guard arrangement to prevent large stones and the like impacting the knife in use. The reciprocating linear motion provides a cutting action to sever the standing crop material, whether that be cereal crops, corn, or grass, by way of example.

Regardless of the application, the knife bar carries inertia when driven in a reciprocating motion. Conventional sickle drive systems include an eccentric shaft on a rotating hub or a wobble drive, for example, both of which compensate for the rapid changes in inertia as the sickle is driven. A known disadvantage of such mechanical sickle drive systems is the large space required to accommodate such, with flywheels being typically located at one or both ends of the knife bar. It has become the norm over past decades for the drive systems to extend laterally outside the width of the driven cutterbar, which can impact and damage crop material standing immediately outside the operational width of the cutterbar.

Efforts have been made to improve the compactness of sickle drive mechanisms, and U.S. Pat. No. 7,401,458, by way of example, discloses a drive mechanism which is incorporated into or beneath a floor of a header away from the ends thereof.

A further disadvantage of known sickle drive mechanisms is the direct relationship between the input speed and the knife bar reciprocating speed. In particular, with reference to combine harvesters, headers are typically driven by a power take-off shaft, which derives power from the harvester. Conventionally, the header drive speed is directionally proportional to the other crop-processing systems, including the threshing and separating systems. Moreover, the cutterbar speed is directly proportional to the other header-mounted driven components, including the reel and crop-gathering auger or draper belts. The downside of this arrangement is that the cutterbar is often driven at a non-optimum speed for the encountered crop conditions and/or ground speed.

European Patent Application Publication 2,976,936 discloses a mowing sickle drive system that includes a linear electric motor configured for driving the knife bar in a reciprocating linear motion. As such, the cutterbar speed can be more easily adjusted, especially in relation to the ground speed and other crop-processing systems. One engineering hurdle encountered when utilizing a linear electric motor compared to the more conventional cutterbar drive mechanisms is the significant inertia of the knife bar being exerted upon the motor. To compensate for the rapid changes in inertia, the system disclosed in European Patent Application Publication 2,976,936 employs coil springs at the ends of the knife bar that serve to absorb the inertial changes and reduce the stresses upon the motor and linkage to the knife bar.

A problem with the coil springs described is that unnecessary opposing forces are encountered by the linear electric motor at low speeds, at which inertia of the knife bar is low.

BRIEF SUMMARY

In accordance with an aspect of the disclosure there is provided a mowing sickle drive system comprising a knife bar supported by a frame, a drive apparatus operable to drive the knife bar in a reciprocating linear motion at a variable drive frequency, and a spring connected to the knife bar for applying a restoring force to the knife bar toward a neutral position when in motion, wherein the spring has a variable modulus of elasticity that is controlled dependent upon the drive frequency.

By providing a spring with a variable modulus of elasticity, the restoring force can be reduced when operating at low knife bar speeds and when inertial forces are lower. The magnitude of the inertial compensation provided by the spring is adjusted based upon the current inertia of the knife bar. The magnitude of the inertia in the reciprocating knife bar is dependent on the speed or frequency at which the knife bar is driven. It is desirable to have the ability to run the knife bar at slower speeds, for example when driven at a speed that is proportional to the forward speed, and the disclosed sickle drive system serves to reduce wear and energy consumption by reducing the restoring force at these low speeds.

It should be appreciated that the term "spring" is intended to be interpreted broadly, and encompass many different types of springs including gas springs, coil springs, and the like. Moreover, the spring may be provided by a combination of components that exhibit spring-like characteristics wherein linear displacement of the knife bar causes energy to be stored by the deformed spring.

The term "modulus or elasticity" is intended to be interpreted based upon its normal understanding, wherein the parameter is a measure of the stiffness of the spring.

The spring is preferably a gas spring comprising a gas-filled chamber that contains a controllable quantity of gas that is varied to adjust the elasticity of the spring. In a preferred embodiment, a flow control valve is provided in communication with a gas-filled chamber, wherein the valve is configured to control a flow of air into and out of the chamber.

In a preferred embodiment, a pair of gas springs are provided in the form of deformable airbags, each having a gas-filled chamber in communication with one or more flow control valves. The airbags may take a similar construction to those employed in vehicle suspensions and may be formed of rubber material, for example. The airbags may be mounted to the frame and arranged to act upon the knife bar in opposing directions and toward the neutral position. As such, any linear movement of the knife bar away from the neutral position causes deformation of one or both airbags. The modulus of elasticity or stiffness presented by the airbags is dependent upon the air pressure inside the gas-filled chamber. For example, a higher air pressure equates to a stiffer spring characteristic or a higher modulus of elasticity.

In an alternative embodiment, a gas spring may comprise an air cylinder and an expansion air tank arranged in mutual fluid communication, wherein the air cylinder comprises a piston connected to the knife bar. In this case, reciprocating linear motion of the knife bar is transferred to the piston. The air pressure in the cylinder and the expansion air tank determines the modulus of elasticity of the spring. A flow control valve may be provided in communication with the air cylinder and/or the expansion tank to control the air pressure therein.

In yet another alternative embodiment, a hydraulic cylinder having a pair of fluid-filled chambers separated by a piston is provided. The piston is connected to the knife bar. The reciprocating motion of the knife bar is translated into reciprocating motion of the piston. A pair of springs, in the form of air charged accumulators for example, are each connected to a respective one of the fluid-filled chambers. A flow control valve is connected to each of the accumulators to control the air pressure therein.

The disclosure lends itself particularly well to knife bars driven by linear motors including, by way of example, electric motors, hydraulic motors, pneumatic motors, and magnetic lead screws. In one preferred embodiment, the drive apparatus comprises a linear electric motor. As described above, the provision of a linear motor permits a compact drive system, which may even be integrated under or immediately behind the knife bar for convenience. When employed on an agricultural harvesting machine, for example, the linear motor permits the knife to be driven at a variable speed or frequency in relation to other moving systems on the machine. For example, the knife bar may be driven at a speed proportional to the ground speed of a harvester, and the other crop processing systems may be kept at a constant speed.

In another preferred embodiment, the linear motor is a magnetic lead screw with a pair of airbags integrated into a housing. The lead screw includes a pair of stops that each act upon a respective airbag, the pressure in which is varied to adjust the inertia compensation required.

The drive system may comprise a control module in communication with the drive apparatus and means to adjust the modulus of elasticity of the spring, wherein the control module is configured to command an increase in the modulus of elasticity in response to an increase in the drive frequency of the knife bar. Advantageously, the stiffness of the spring may be increased with increasing knife bar speeds (and resulting inertia), thus providing inertia compensation only when required. Conversely, reduced stiffness is provided at slower drive frequencies so as to minimize wear and energy consumption.

The control module may be configured to command an increase in the stiffness of the spring in response to the drive frequency exceeding a predetermined upper threshold value. For example, the pressure of a gas-filled chamber of a gas spring may be kept at a level equal to atmospheric pressure until the drive frequency exceeds the upper threshold value, whereupon the air pressure is increased to increase the stiffness of the system. Such increase in air pressure may be enacted simply by closing an exhaust valve, which fixes the quantity of air in the chamber, thus causing an increase in pressure as the chamber is compressed (reduced volume).

Conversely, the control module may be configured to command a decrease in the stiffness of the spring in response to the drive frequency falling below a predetermined lower threshold value.

As indicated above, the disclosure lends itself particularly well to mowing sickle drive systems embodied on headers of agricultural harvesting machines such as combine harvesters. In such case, the control module may be located in the cab of the combine harvester remote from the knife bar.

BRIEF DESCRIPTION OF THE DRAWINGS

Further advantages of the disclosure will become apparent from reading the following description of specific embodiments with reference to the appended drawings in which:—

DETAILED DESCRIPTION

Embodiments of the mowing sickle drive system will be described below with reference to a combine harvester with a header having a cutterbar. However, it should be understood that mowing sickle drive systems in accordance with aspects of the disclosure may be embodied in alternative applications including agricultural mowers and other machines containing mowing sickles.

Figure 1:
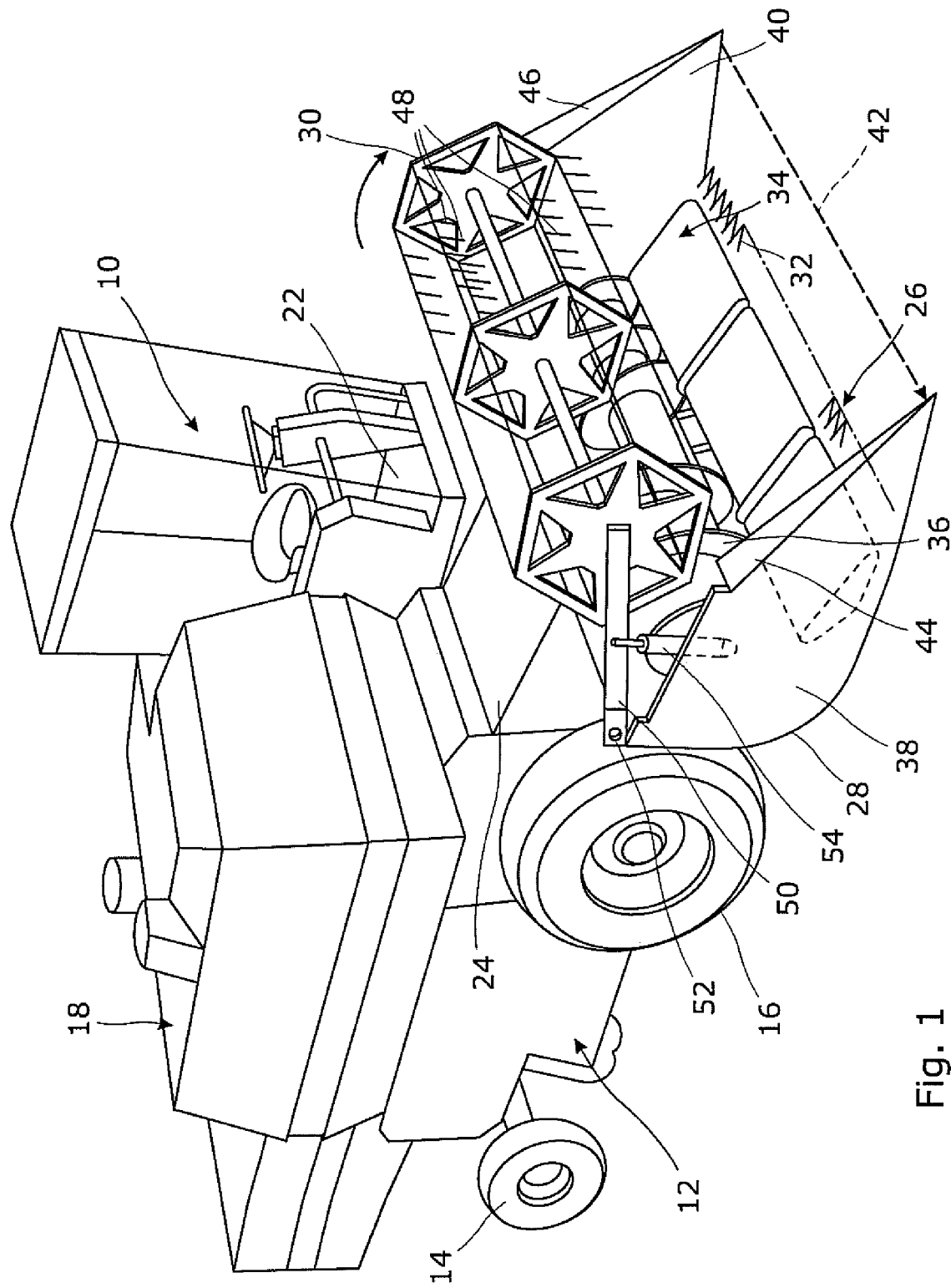
FIG. 1 is a perspective view of a combine harvester comprising a mowing sickle drive system on the header thereof.

As shown in FIG. 1, a combine 10 comprises a main body 12 mounted on steerable rear wheels 14 and driven front wheels 16 and constituting a harvesting vehicle. The main body 12 houses an engine 18 and conventional grain crop threshing and separating apparatus (not shown), such as a threshing cylinder and concave, straw walkers, and a shaker shoe. The main body also provides a grain tank and an operator cab 22.

Mounted at the front of main body 12 on a feederhouse 24 is header 28. The header 28 comprises crop-gathering apparatus 26 to receive cut crop, a reel 30, crop-cutting means in the form of a cutterbar 32, crop-conveying apparatus 34, and an auger 36. The feederhouse 24 is pivotally mounted at its rear end in the usual manner, and hydraulic rams (not shown) are provided to raise and lower its forward end. The forward end of the feederhouse 24 has conventional attachment means (not shown) whereby the header is mounted thereon so as to be quickly detachable.

Header 28 has end walls 38, 40 defining a crop-gathering width 42, and each end wall has a forwardly sloping front edge providing crop dividers 44, 46.

Reel 30 is of a conventional construction, having tines 48 and a mechanism for maintaining the tines 48 in a downwardly projecting attitude as the reel rotates. The reel 30 is mounted on the support arms 50 which are pivotally connected to the table 52, whereby the reel 30 can be raised and lowered by means of hydraulic rams 54 in the usual manner.

Cutterbar 32 comprises a reciprocating knife bar 56 having a serrated sharpened cutting edge 58, knife guides 60, and forwardly projecting fingers 62.

The crop-conveying apparatus 34 in this embodiment comprises three crop-conveying belts arranged side by side across the crop-gathering width 42 of header 28.

Figure 2:
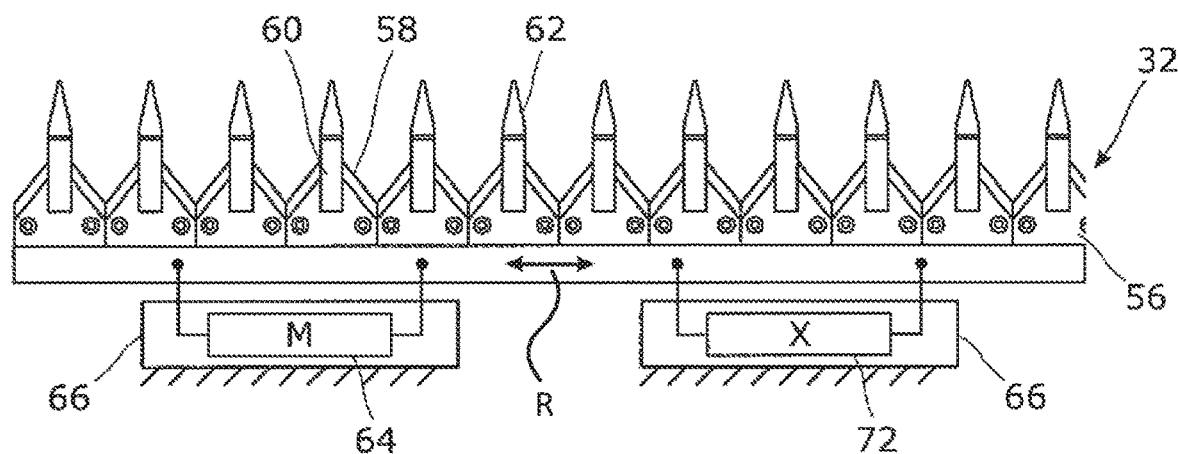
FIG. 2 is a schematic plan view of part of a mowing sickle drive system in accordance with a generic embodiment of the disclosure.

The knife bar 56 is driven in a reciprocating linear motion as indicated by arrow R by a linear electric motor 'M' 64 represented schematically in FIG. 2 and connected to the knife bar 56. The motor 64 is secured to a frame member 66 which is an integral part of header 28. The electric motor 64 may be assembled in a variety of different ways but, by way of example, may be constructed as disclosed in European Patent Application Publication 2,976,936, the contents of which are incorporated herein by reference.

Alternatively, the electric motor M 64 can be replaced with other linear motors including a hydraulic motor, a pneumatic motor, or a magnetic lead screw to deliver a reciprocating linear driving force to the knife bar 56.

Figure 4:
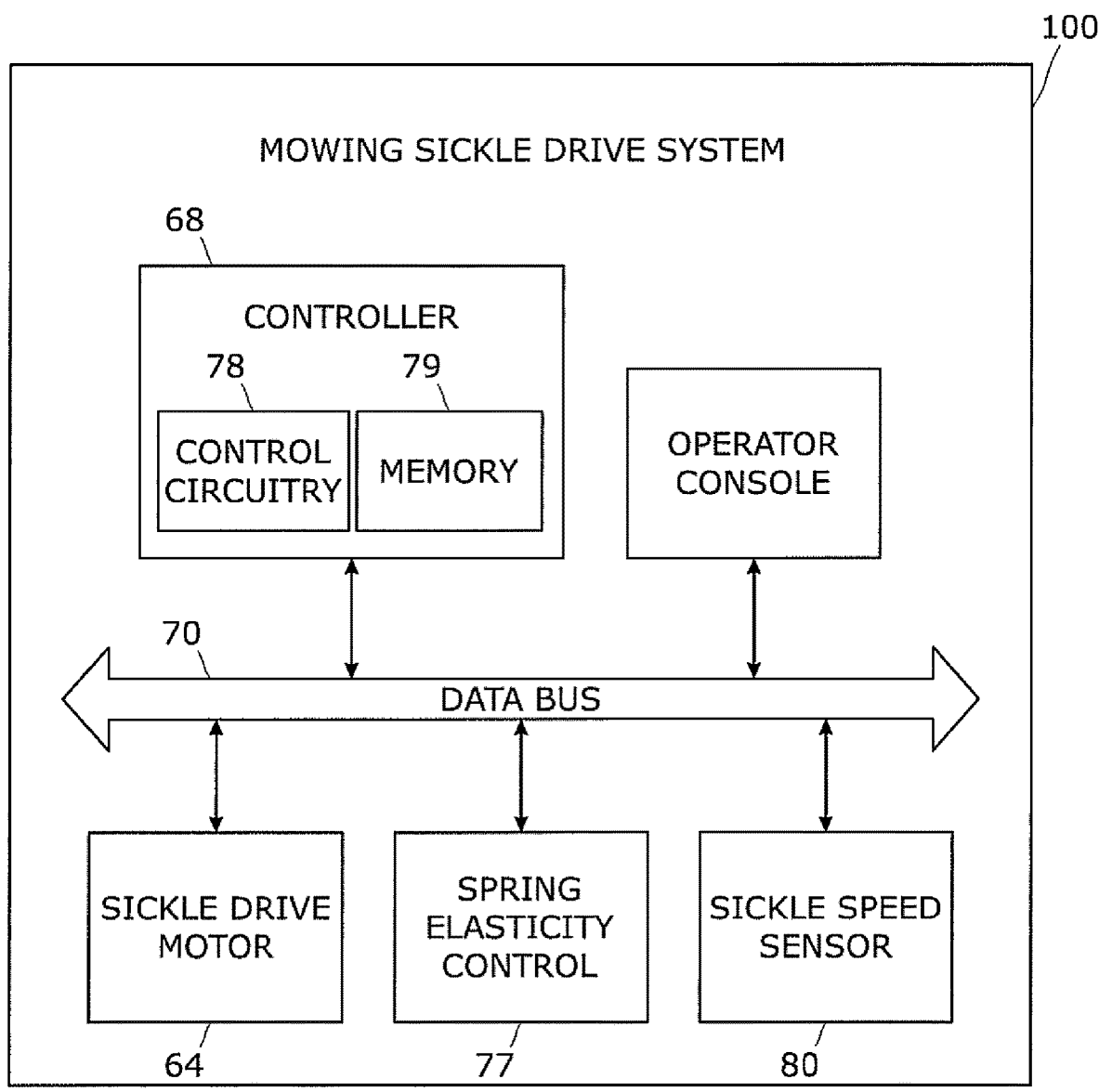
FIG. 4 is a block diagram illustrating the components of the mowing sickle drive system in accordance with the first embodiment.

Turning back to the illustrated embodiment, drive motor 64 is powered and controlled by a controller 68 which forms part of the overall mowing sickle drive system 100 illustrated in FIG. 4. The controller 68 will be described in more detail below, but may be positioned in the cab 22 and electrically connected to the drive motor 64 via an electrical harness that includes a data-bus 70.

In accordance with an aspect of the disclosure, an inertia compensation device 72 is mounted to a frame 66 and connected to the knife bar 56. The inertia compensation device 72 can be considered as a spring that recovers the inertial energy of each reciprocating stroke movement of the cutterbar 56, neutralizing the inertia in the system and reducing stresses on the motor 64. The inertia compensation device 72 has a variable modulus of elasticity or stiffness that is controlled dependent upon the drive frequency with which the knife bar 56 is driven. At higher drive frequencies, the stiffness of the device 72 is increased. Conversely, at lower drive frequencies, the stiffness of the device 72 is reduced so as to reduce wear and energy consumption at low speeds.

The inertia compensation device 72 is represented generically in FIG. 2. Specific of examples of the inertia compensation device 72 are provided in the following description.

Figure 3:
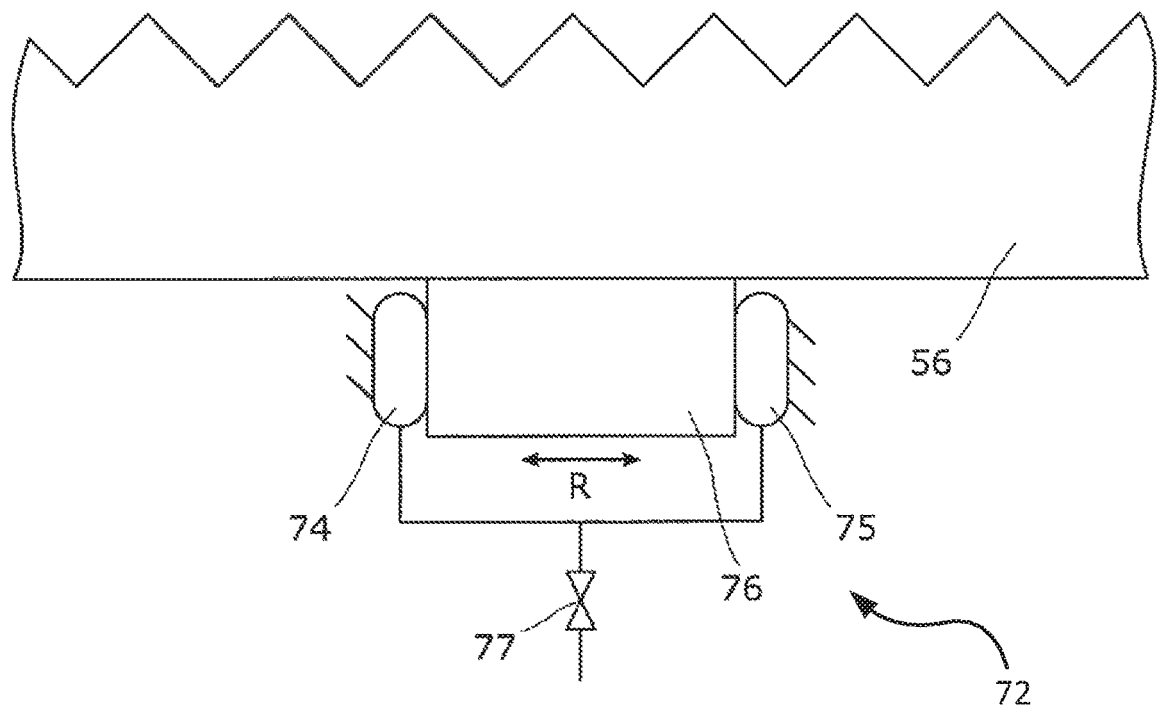
FIG. 3 is a schematic plan view of part of a sickle drive system in accordance with a first embodiment of the disclosure.

With reference to FIG. 3, a first embodiment includes a pair of gas springs 74, 75 in the form of deformable airbags which may be provided by commonly available, off-the-shelf, air-bag-type springs used in vehicles suspension systems. Each airbag 74, 75 is supported between the frame 66 (FIG. 2) and opposing sides of a weldment 76 secured to the knife bar 56. Reciprocating linear motion of knife bar 56 as represented by arrow R causes the airbags 74, 75 to expand and contract due to changing compressive forces thereon by weldment 76.

It should be understood that the embodiment illustrated by FIG. 3 is highly schematic and that the airbags 74, 75 may be mounted between the frame 66 and knife bar 56 in various different manners. For example, the airbags 74, 75 may be mounted instead so as to act directly upon opposing ends of the knife bar 56.

When the knife bar 56 moves to the left as viewed in FIG. 3, airbag 74 is caused to compress. When the knife bar 56 moves to the right, then airbag 75 is caused to compress. A flow control valve 77 is connected to both airbags 74 and 75, although it should be understood that a pair of independent flow control valves may instead be provided.

When open, the flow control valve 77 allows air to freely enter and leave the airbags 74, 75, effectively providing constant atmospheric pressure regardless of their compression state. By closing or restricting the flow through the valve 77, the pressure in the airbags 74, 75 can be caused to increase in conjunction with a reduction in volume as the cutter bar 56 compresses the airbags 74, 75. As such, this increase in pressure causes the effective stiffness or modulus of elasticity provided by these airbags 74, 75 to increase.

With reference to FIG. 4, the mowing sickle drive system 100 comprises the controller 68, which includes control circuitry 78 and memory 79. The controller 68 communicates with the sickle drive motor 64 via the data-bus 70 as described above. Moreover, the flow control valve 77 serves to control the elasticity of the airbags 74, 75, and is controlled by the controller 68. The valve 77 is controlled dependent upon the drive frequency or speed of knife bar 56. The knife speed may be taken directly as equating to the commanded speed provided by controller 68. Alternatively, the knife speed may be sensed by a sickle speed sensor 80.

In one example method of operation, the valve 77 is simply closed when the drive frequency of the knife bar 56 exceeds a predetermined upper threshold value so that the effective stiffness provided by the airbags 74, 75 is increased and the higher inertial forces in the system are thus neutralized. When the knife drive frequency is sensed as falling below a lower threshold value, which may be the same as the upper threshold value, then the controller 68 opens the flow control valve 77 so as to effectively reduce the stiffness of airbags 74, 75, thus reducing the restoring forces associated with lower inertia at lower speeds.

In a second method of operation, the air pressure in airbags 74, 75 is controlled by the valve 77 in a continuously variable relationship directly proportional to the drive frequency of the knife bar 56.

In an alternative arrangement, the flow control valve 77 may be replaced with a more complex pneumatic circuit that includes a source of pressurized air, which is selectively used to actively control the air pressure in the airbags 74, 75.

Figure 5:
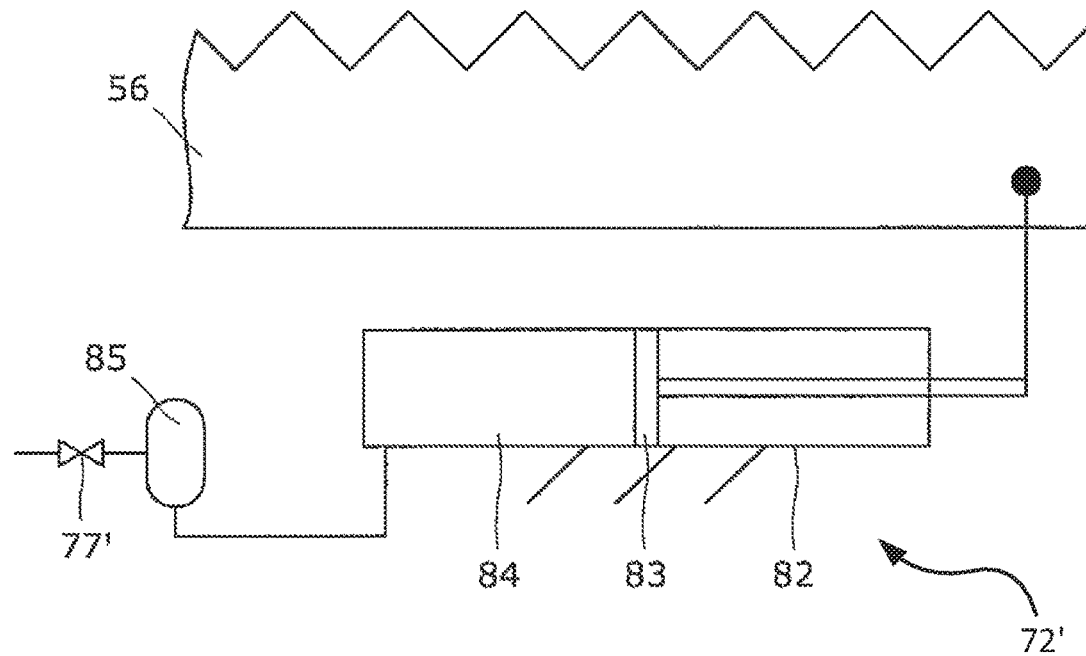
FIG. 5 is a schematic plan view of part of sickle drive system in accordance with a second embodiment of the disclosure.
Figure 6:
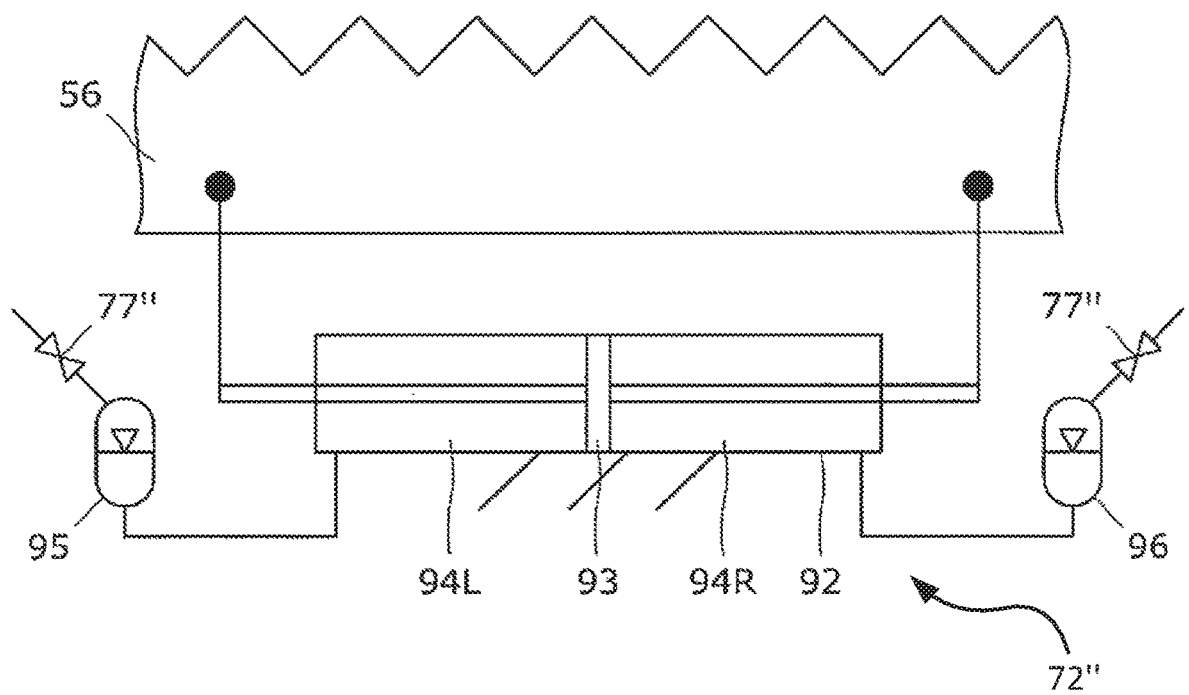
FIG. 6 is a schematic plan view of part of a sickle drive system in accordance with a third embodiment of the disclosure; and, FIG. 7 is a schematic plan view of part of a sickle drive system in accordance with a fourth embodiment of the disclosure.

With reference to FIG. 5, a second embodiment of an inertia compensation device 72' is shown comprising a pneumatic cylinder 82 having a piston 83 secured to knife bar 56. The cylinder 82 is aligned parallel to the knife bar 56 and secured to the frame 66 (FIG. 2) so that reciprocating motion of the knife bar 56 is translated into reciprocating motion of the piston 83. The cylinder 82 defines a gas-filled chamber 84, the volume of which changes with movement of the piston 83. The chamber 84 is connected to an expansion tank 85, which is represented schematically in FIG. 5. A flow control valve 77' is connected to the expansion tank 85 and serves a similar function to that described above with reference to FIGS. 3 and 4.

The pneumatic cylinder 82 and the expansion tank 85 can together be considered as an air spring having a modulus of elasticity which can be varied by the controlled flow of air through valve 77'.

With reference to FIG. 5, a third embodiment of an inertia compensation device 72" includes a hydraulic cylinder 92 having a pair of fluid filled chambers 94L, 94R separated by a piston 93 connected to the knife bar 56. The hydraulic cylinder 92 is aligned parallel to the knife bar 56 so that reciprocating linear motion of the knife bar 56 is translated into reciprocating motion of piston 93.

Each of the hydraulic chambers 94L, 94R has connected thereto a respective air-charged accumulator 95, 96, which together provide a spring characteristic to the cylinder 92. Movement of knife bar 56 causes compression in one fluid chamber and contraction in the other, the compression and expansion acting upon the pressurized air in accumulators 95, 96.

Each accumulator 95, 96 offers a variable stiffness to the system by the provision of respective flow control valves 77" that regulate the flow of air into and out of the accumulators 95, 96. By closing the flow control valves 77" the quantity of air in the accumulators 95, 96 becomes fixed, thus presenting a higher stiffness or modulus of elasticity to the knife bar 56. Conversely, if the flow control valves 77" are opened, then the stiffness of the inertia compensation device is reduced.

Figure 7:
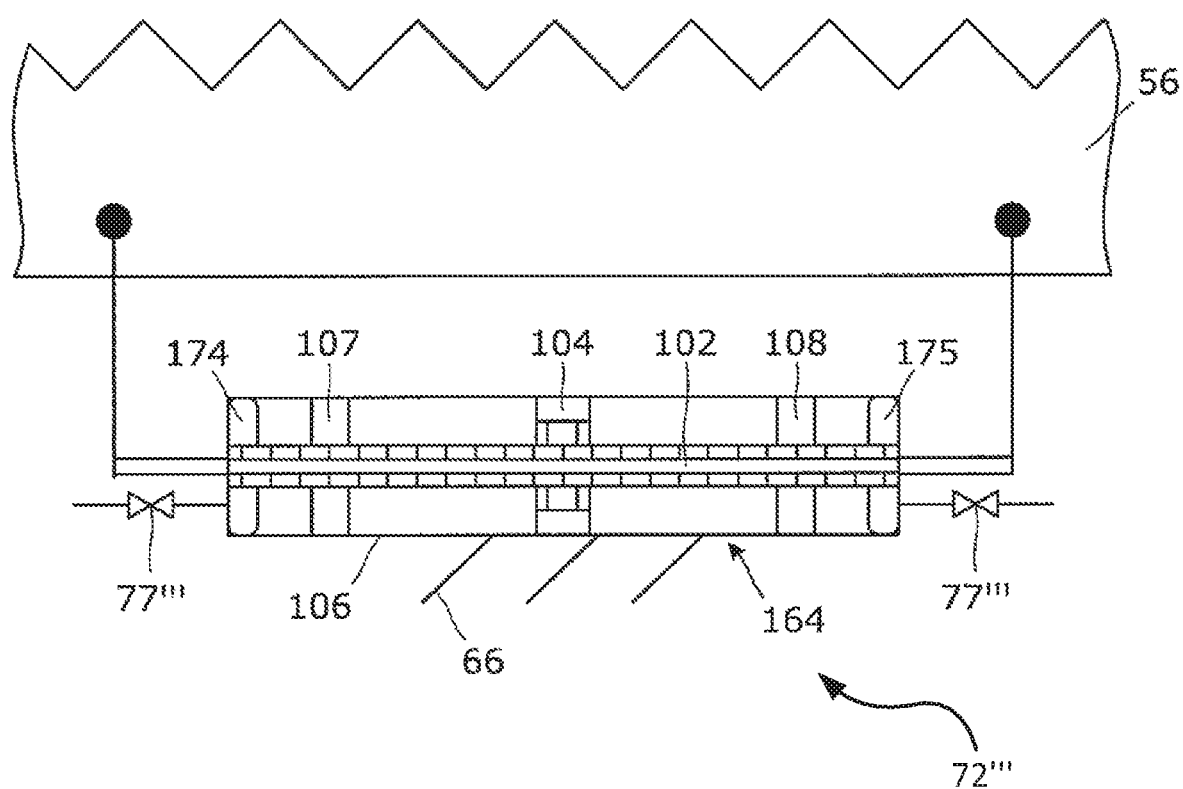

With reference to FIG. 7, a fourth embodiment of the inertia compensation device 72''' is integrated into the linear motor, which in this case is a magnetic lead screw (MLS) 164. The MLS 164 comprises a magnetic screw 102 aligned parallel to the knife bar 56 and a magnetic nut 104 secured to the inside walls of a generally cylindrical housing 106. The housing 106 is secured to the frame 66.

The magnetic screw 102 is coupled at one or both ends to the knife bar 56 so that reciprocating linear motion of the magnetic screw 102 is translated into reciprocating motion of the knife bar 56.

A pair of stops 107, 108 are secured to the magnetic screw 102 at positions spaced between the magnetic nut 104 and the ends of housing 106. A pair of annular airbags 174, 175 are disposed in outboard ends of the housing 106, wherein the magnetic screw 102 passes through the aperture in the airbags 174, 175.

The MLS 164 is powered to drive the knife bar 56 in a reciprocating motion at a drive frequency. When driven, the stops 107, 108 impact upon the airbags 174, 175. Each airbag 174, 175 offers a variable stiffness to the system by the provision of respective flow control valves 77''' that regulate the flow of air into and out of the airbags 174, 175. By closing the flow control valves 77", the quantity of air in the airbags 174, 175 becomes fixed, thus presenting a higher stiffness or modulus of elasticity to the knife bar 56. Conversely, if flow control 77" are opened, then the stiffness of the inertia compensation device 72''' is reduced.

It should be emphasized that the above-described embodiments of the present disclosure are merely possible examples of implementations, merely set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure and protected by the following claims.

The invention claimed is:

1. A mowing sickle drive system comprising:
   a knife bar supported by a frame;
   drive apparatus operable to drive the knife bar in a reciprocating linear motion at a variable drive frequency;
   a spring coupled to the knife bar for applying a restoring force to the knife bar toward a neutral position when in motion, wherein the spring has a variable modulus of elasticity that is dependent upon the drive frequency; and
   a control module in communication with the drive apparatus and the inertia compensation device, wherein the control module is configured to command an increase in the modulus of elasticity of the spring in response to an increase in the drive frequency of the knife bar.

2. The drive system of claim 1, wherein the spring comprises at least one gas spring.

3. The drive system of claim 2, further comprising a flow control valve in communication with a gas-filled chamber of the at least one gas spring, wherein the flow control valve is configured to control a flow of air in to, and out of, the chamber in order to control the modulus of elasticity of the at least one gas spring.

4. The drive system of claim 3, wherein the at least one gas spring comprises of a pair of deformable airbags, each having a gas-filled chamber in communication with the flow control valve.

5. The drive system of claim 4, wherein airbags are mounted to the frame and arranged to act upon the knife bar in opposing directions and toward the neutral position.

6. The drive system of claim 3, wherein the at least one gas spring comprises an air cylinder and an expansion air tank arranged in mutual fluid communication, wherein the air cylinder comprises a piston connected to the knife bar.

7. The drive system of claim 1, further comprising:
   a hydraulic cylinder having a pair of fluid-filled chambers separated by a piston connected to the knife bar, wherein the reciprocating linear motion of the knife bar is translated into reciprocating motion of the piston, wherein the spring comprises a pair of air-charged accumulators each connected to a respective one of the fluid-filled chambers and having a respective flow control valve connected thereto, wherein the valves are configured to control a flow of air in to, and out of, the respective accumulators in order to control the modulus of elasticity of the accumulators.

8. The drive system of claim 1, wherein the drive apparatus comprises a linear electric motor coupled to the knife bar.

9. The drive system of claim 1, wherein the drive apparatus comprises a magnetic lead screw.

10. The drive system of claim 9, wherein the at least one gas spring comprises of a pair of deformable airbags, each having a gas-filled chamber in communication with the flow control valve, wherein the magnetic lead screw comprises a magnetic screw, a magnetic nut, and a pair of stops secured to the magnetic screw enclosed in a cylindrical housing, wherein the cylindrical housing also encloses the airbags, wherein in operation the stops act upon the airbags.

11. A The drive system of claim 10, wherein each airbag is annular and surrounds the magnetic screw.

12. The drive system of claim 1, wherein the control module is configured to command an increase in the modulus of elasticity in response to the knife bar frequency exceeding a predetermined upper threshold value.

13. The drive system of claim 1, wherein the control module is configured to command a decrease in the modulus of elasticity in response to the knife bar frequency falling below a predetermined lower threshold value.

14. The drive system of claim 3, wherein the control module is configured to command the flow control valve to close when the knife bar frequency exceeds a predetermined upper threshold value.

15. A header for attachment to a combine harvester, the header comprising a mowing sickle drive system comprising:
  a knife bar supported by a frame;
  drive apparatus operable to drive the knife bar in a reciprocating linear motion at a variable drive frequency;
  a spring coupled to the knife bar for applying a restoring force to the knife bar toward a neutral position when in motion, wherein the spring has a variable modulus of elasticity that is dependent upon the drive frequency; and
  a control module in communication with the drive apparatus and the inertia compensation device, wherein the control module is configured to command an increase in the modulus of elasticity of the spring in response to an increase in the drive frequency of the knife bar.

16. A combine harvester and header combination comprising a mowing sickle drive system comprising:
  a knife bar supported by a frame;
  drive apparatus operable to drive the knife bar in a reciprocating linear motion at a variable drive frequency;
  a spring coupled to the knife bar for applying a restoring force to the knife bar toward a neutral position when in motion, wherein the spring has a variable modulus of elasticity that is dependent upon the drive frequency; and
  a control module in communication with the drive apparatus and the inertia compensation device, wherein the control module is configured to command an increase in the modulus of elasticity of the spring in response to an increase in the drive frequency of the knife bar.

17. The combine harvester and header combination of claim 16, wherein the control module is located on the combine harvester.

* * * * *